Patented Sept. 22, 1925.

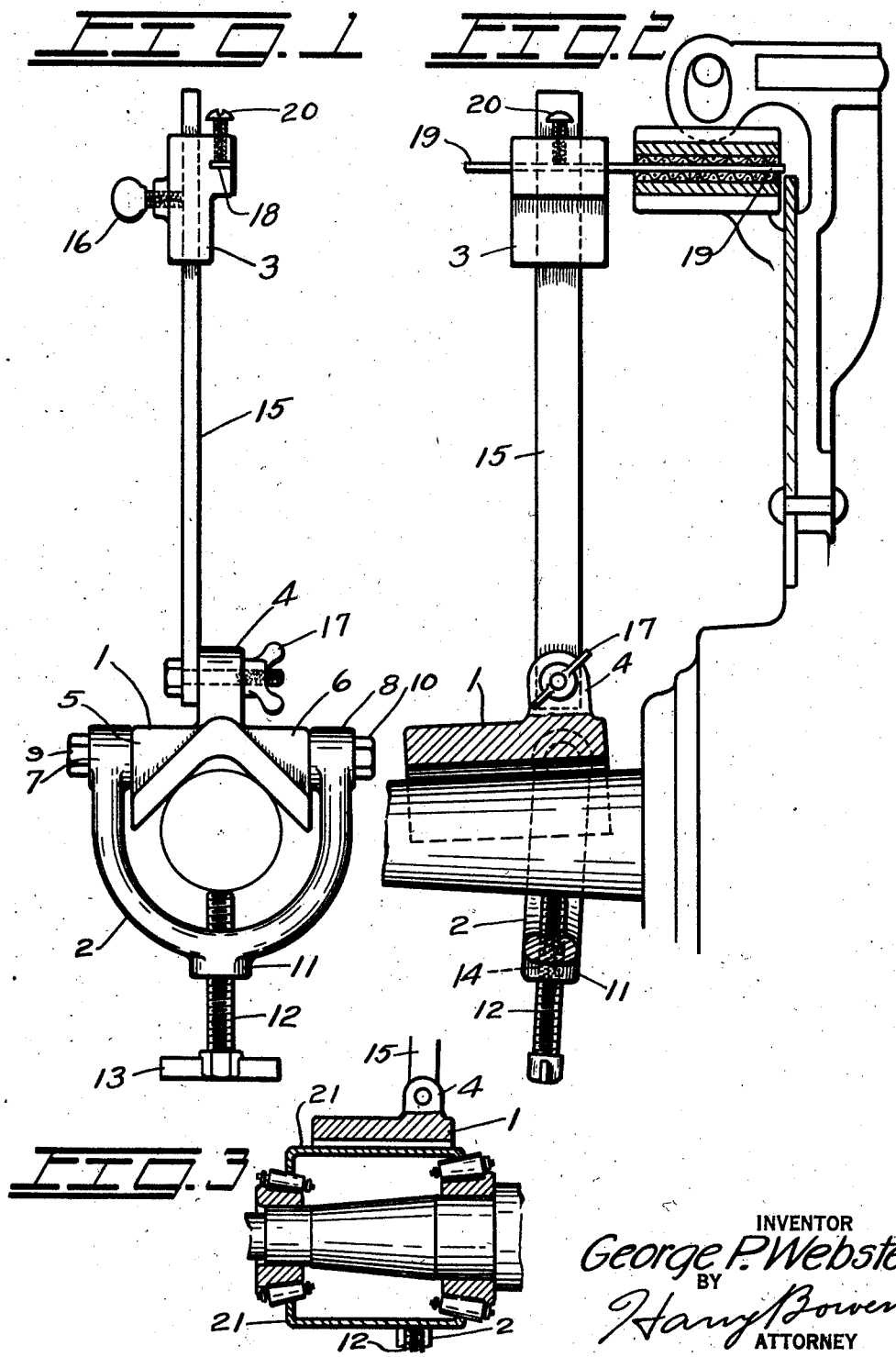

1,554,610

UNITED STATES PATENT OFFICE.

GEORGE P. WEBSTER, OF SEATTLE, WASHINGTON.

BRAKE-ADJUSTING GAUGE.

Application filed February 26, 1925. Serial No. 11,721.

*To all whom it may concern:*

Be it known that I, GEORGE P. WEBSTER, a citizen of the United States, residing at Seattle, county of King, and State of Washington, have invented a new and useful Brake-Adjusting Gauge; and I do hereby declare that the following is a full, clear, and exact specification, such as will enable others skilled in the art to which it appertains to make and use the same.

The invention is a gauge for adjusting brake linings to a perfect circle.

The object of the invention is to provide a device for adjusting brake linings which may readily be used on any type of wheel having a brake thereon.

Another object of the invention is to provide a device for adjusting brake linings which may readily be set to a brake of any diameter.

A further object of the invention is to provide a device for adjusting brake linings which may readily be held on any type of shaft.

And a still further object of the invention is to provide a device for readily adjusting brake linings which is of a simple and economical construction.

With these ends in view, the invention embodies a hub having a V-shaped opening, a yoke with an adjusting screw for clamping the hub on a shaft or the like, a bar pivotally attached to the hub and a thin bar adjustably held on the outer end of, and perpendicular to the former bar.

Other features and advantages of the invention will appear from the following description taken in connection with the drawings, wherein:—

Figure 1 is a front view of the device.

Figure 2 is a side view of the device showing it as it would be used in which a portion of the hub is broken away.

Figure 3 is a view showing a means for attaching the device to the axle of the front wheel of a motor vehicle.

In the drawings I have shown my device as it would be constructed wherein numeral 1 indicates the hub, numeral 2 the yoke that is pivotally attached to the hub, and numeral 3 the gauge block that is slidably held on a bar extending from the hub and in which the gauge arm is adjustably held.

The hub 1 is constructed as shown in Figures 1 and 2 of a V-shaped piece of material with a lug 4 extending from its vertex and adjacent one end and hubs 5 and 6 on its outer surface and also adjacent the end upon which is the lug 4.

The yoke 2 is provided with hubs 7 and 8 by which it is pivotally held to the hub 1 by bolts 9 and 10 and also a hub 11 in which an adjusting screw 12 with a bar 13 at its outer end by which it may be rotated is held in a threaded hole 14.

The block 3 is slidably held on a bar 15 by a thumb screw 16 and the bar 15 is adjustably held to the lug 4 on the hub by a screw 17; and in the upper portion of the block 3 is an opening 18 in which is a small bar 19 which extends at right angles to the bar 15, and which may be held by a set screw 20.

The design shown in Figure 3 shows the hub 1 held on a sleeve 21 so that it may readily be held on the bearings of the front axle of a motor vehicle wheel as shown.

It is understood that other changes may be made in the construction without departing from the spirit of the invention. One of which changes may be in the design of the hub, another may be in the means for attaching the hub to a shaft, another may be in the means for holding the small arm to the bar, and still another may be in the use of any other means to facilitate the application of the hub to a wheel or axle.

The construction will be readily understood from the foregoing description. To use the device the wheel and brake drum may be removed and the hub 1 placed upon the shaft at the center of the brake lining. The arm 19 may then be adjusted to the radius of the brake drum or to the space between the linings and then it will be observed that as the device is rotated, the arm 19 will indicate whether or not the linings form a true circle, and it will also be observed that by using the device the brake linings may readily be adjusted to a true circle.

Having thus fully described the invention, what I claim as new and desire to secure by Letters Patent, is:—

1. In a gauge of the class described, a hub, means for adjustably holding the hub to a shaft or the like a bar pivotally attached to the hub, a block slidably and adjustably held on the bar and an arm adjustably held in the block in such a manner that it is perpendicular to the bar and substantially parallel to the axis of the hub.

2. In a gauge for band brakes or the like, an arm, a bar, means for slidably and adjustably holding the arm on the bar, a hub to which the bar is pivotally held, said hub having a V-shaped opening in it, and a yoke with an adjusting screw therein pivotally attached to the hub.

GEORGE P. WEBSTER.